(12) United States Patent
Chang et al.

(10) Patent No.: US 10,976,758 B2
(45) Date of Patent: Apr. 13, 2021

(54) VALVE CORE CONNECTION STRUCTURE AND STOP VALVE SET OF VALVE ASSEMBLY

(71) Applicant: Globe Union Industrial Corp., Taichung (TW)

(72) Inventors: Tachun Chang, Taichung (TW); Yueping Xiao, Shen Zen (CN); Kaizhong He, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 205 days.

(21) Appl. No.: 16/021,228

(22) Filed: Jun. 28, 2018

(65) Prior Publication Data

US 2019/0243395 A1   Aug. 8, 2019

(30) Foreign Application Priority Data

Feb. 8, 2018   (CN) .......................... 201810129702.8

(51) Int. Cl.
*G05D 23/13* (2006.01)
*G05D 23/185* (2006.01)

(52) U.S. Cl.
CPC ......... *G05D 23/1313* (2013.01); *G05D 23/13* (2013.01); *G05D 23/134* (2013.01); *G05D 23/1306* (2013.01); *G05D 23/1326* (2013.01); *G05D 23/1353* (2013.01); *G05D 23/1373* (2013.01); *G05D 23/1858* (2013.01)

(58) Field of Classification Search
CPC ........... G05D 23/1313; G05D 23/1306; G05D 23/13; G05D 23/1326; G05D 23/1353; G05D 23/134; G05D 23/1858; G05D 23/1373
USPC ...................................... 236/12.15
See application file for complete search history.

(56) References Cited

U.S. PATENT DOCUMENTS 9,334,971 B2   5/2016   Brouwer et al.
2017/0051835 A1   2/2017   Williams

*Primary Examiner* — Edward F Landrum
*Assistant Examiner* — Nael N Babaa
(74) *Attorney, Agent, or Firm* — Alan D. Kamrath; Karin L. Williams; Mayer & Williams PC

(57) ABSTRACT

A valve core connection structure of a valve assembly comprising: a body, two stop valve sets, two limitation structures, and two locking sleeves. The body includes a holder, a cold-water inflow connector, a hot-water inflow connector, a first outflow connector, a second outflow connector, a cold-water inflow seat, and a hot-water inflow seat. Each stop valve set includes a valve core, a limiting loop, a defining structure, and a locating structure. Each limitation structure is defined between a peripheral fence of each second accommodation cavity and the limiting loop so that the limiting loop is retained on the peripheral fence of each second accommodation cavity, thus limiting rotation of the limiting loop. Each locking sleeve is screwed on the cold-water inflow seat and the hot-water inflow seat so that the limiting loop and the valve core are limited in each second accommodation cavity.

19 Claims, 8 Drawing Sheets

VALVE CORE CONNECTION STRUCTURE AND STOP VALVE SET OF VALVE ASSEMBLY

FIELD OF THE INVENTION

The present invention relates to a temperature control valve or a thermostatic valve of bathroom equipment, and more particularly to a valve core connection structure and a stop valve set of a valve assembly.

BACKGROUND OF THE INVENTION

A conventional temperature control valve or a thermostatic valve assembly of bathroom equipment is employed to adjust or set a temperature of a water supply. The conventional valve assembly contains a temperature control valve set and two stop valve sets. The temperature control valve set has a boy on which a holder is formed, and the holder has a first inflow connector, a second inflow connector, a first outflow connector, and a second outflow connector. The first inflow connector has a first inflow seat, and the second inflow connector has a second inflow seat. The two stop valve sets are fixed on the first outflow connector and the second outflow connector respectively so as to control cold water and hot water to flow or to stop flowing into the holder. The holder is configured to accommodate a mixing valve and an operation bar for controlling the mixing valve so as to control water supply from the first outflow connector and the second outflow connector and its temperature. Preferably, the mixing valve is capable of controlling a temperature of the water supply by mating with a pressure balance valve. The first outflow connector is in connection to a shower via an upper water tube, and the second outflow connector is coupled to a faucet through a lower water tube. A valve core of each stop valve set is limited on each of the first outflow connector and the second outflow connector by way of a C retainer so as to limit movement of the valve core.

However, the C retainer is operated to limit the valve core by a specific tool, such as a ring clamp, thus having troublesome operation. Furthermore, the C retainer cannot limit the valve core on a desired angle.

In other words, the valve core cannot be fixed on an opening position and a closing position exactly. For example, after the first inflow connector and the second inflow connector connect with the water supply pipe, operator cannot learn the valve cores are located on the opening position or the closing position, so it is difficult to know the valve core is in open state or in close state.

Universal valve body is disclosed in U.S. Pat. No. 9,334,971 B2 and contains a C retainer manually operated, but it is impossible to limit a valve core on the opening position and the closing position. The valve body also contains a rotary bar arranged on a top of the stop valve and having an indicator configured to indicate the opening state or the closing state of the valve core. But the valve core is not limited on the opening position and the closing position, so the valve core cannot be rotatably opened or closed accurately and quickly.

A fixer of a stop valve is disclosed in U.S. Pat. No. 9,334,971 B2 and CN 106468369A so as to connect and remove a C retainer, but the stop valve cannot be limited on the opening position and the closing position.

The present invention has arisen to mitigate and/or obviate the afore-described disadvantages.

SUMMARY OF THE INVENTION

The primary aspect of the present invention is to provide a valve core connection structure and a stop valve set of a valve assembly which is maintained or replaced easily so as to rotate valve cores of two stop valve sets to the opening position or the closing position.

To obtain the above aspect, a valve core connection structure and a stop valve set of a valve assembly provided by the present invention contains: a body, two stop valve sets, two limitation structures, and two locking sleeves.

The body includes a holder, a first inflow connector extending from a first side of the holder, a second inflow connector extending from a second side of the holder opposite to the first inflow connector, a first outflow connector extending from a top of the body, and a second outflow connector extending from a bottom of the body opposite to the first outflow connector. The first inflow seat is formed on the first inflow connector, and a second inflow seat formed on the second inflow connector. The holder has a first accommodation cavity defined in the holder, and the first inflow seat and the second inflow seat have two second accommodation cavities defined in the first inflow seat and the second inflow seat respectively so as to communicate with the first accommodation cavity via the first inflow connector and the second inflow connector individually.

Each of the two stop valve sets includes a valve core, a limiting loop, a defining structure, and a locating structure. The valve core is accommodated in each of the two second accommodation cavities of the body, the limiting loop is fitted on the valve core, and the defining structure is defined between the valve core and the limiting loop so that the valve core retains with the limiting loop so as to avoid a removal of the limiting loop from the valve core. The locating structure is defined between the valve core and the limiting loop so that the valve core rotates between an opening position and a closing position of a predetermined angle relative to the limiting loop.

Each of the two limitation structures is defined between a peripheral fence of each second accommodation cavity and the limiting loop so that the limiting loop is retained on the peripheral fence of each second accommodation cavity, thus limiting rotation of the limiting loop.

Each of the two locking sleeves is screwed on the first inflow seat and the second inflow seat so that the limiting loop and the valve core are limited in each second accommodation cavity.

The two valve cores are limited within the 90 degrees and are quickly rotated and fixed on the opening position and the closing position. Preferably, each valve core has an indicator arranged on a top thereof so as to determine a position (such as the opening position, the closing position or between the opening position and the closing position) of each valve core. The indicator of each valve core is an elongated slot, wherein when the elongated slot is horizontal, it represents that the valve core (i.e. the other valve core on the second inflow seat) is located on the opening position. When the elongated slot is vertical, it denotes that the valve core (i.e. the one valve core on the first inflow seat) is located on the closing position.

Accordingly, each valve core of the valve assembly is rotated within the 90 degrees (i.e. between the opening position and the closing position) by using the limiting loop so that maintenance staff learns the opening position and the closing position accurately by touching each valve core and the limiting loop, and each valve core is rotated between the opening position and the closing position clearly by using the indicator on each valve core so as to facilitate installation, testing of water leakage, maintenance, and replacement. For example, in the testing of water leakage, each valve core is rotated and fixed on the opening position exactly. Before the maintenance and the replacement, each valve core is rotated and fixed on the closing position exactly so as to avoid water permeability or water splash.

The two stop valve sets of the valve assembly are fixed randomly, easily, and quickly so as to obtain foolproof purpose, and the two stop valve sets are produced at low fabrication cost.

DETAILED DESCRIPTION OF THE PREFERRED EMBODIMENTS

Figure 1:
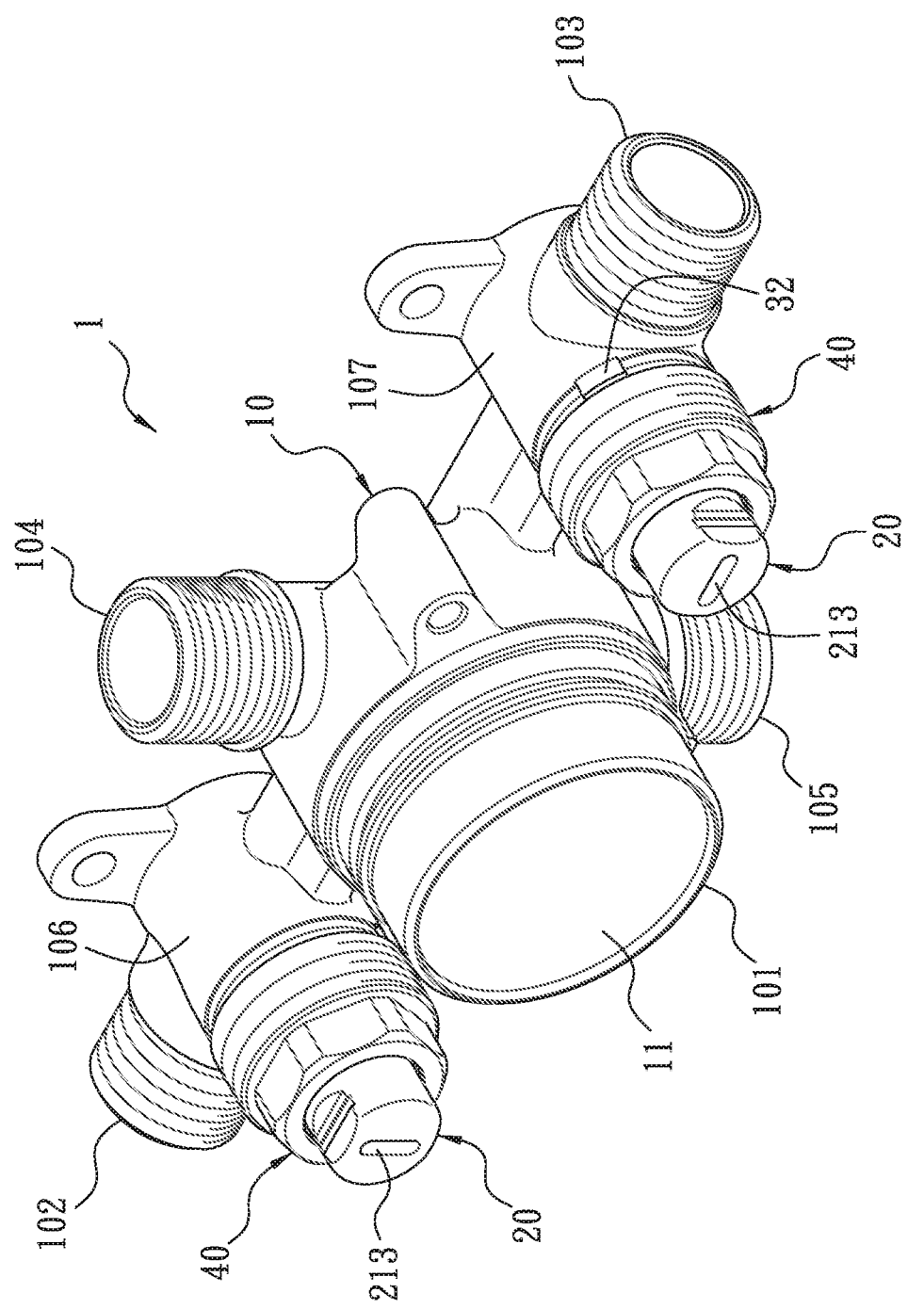
FIG. 1 is a perspective view showing the assembly of a valve core connection structure and a stop valve set of a valve assembly according to a preferred embodiment of the present invention.
Figure 2:
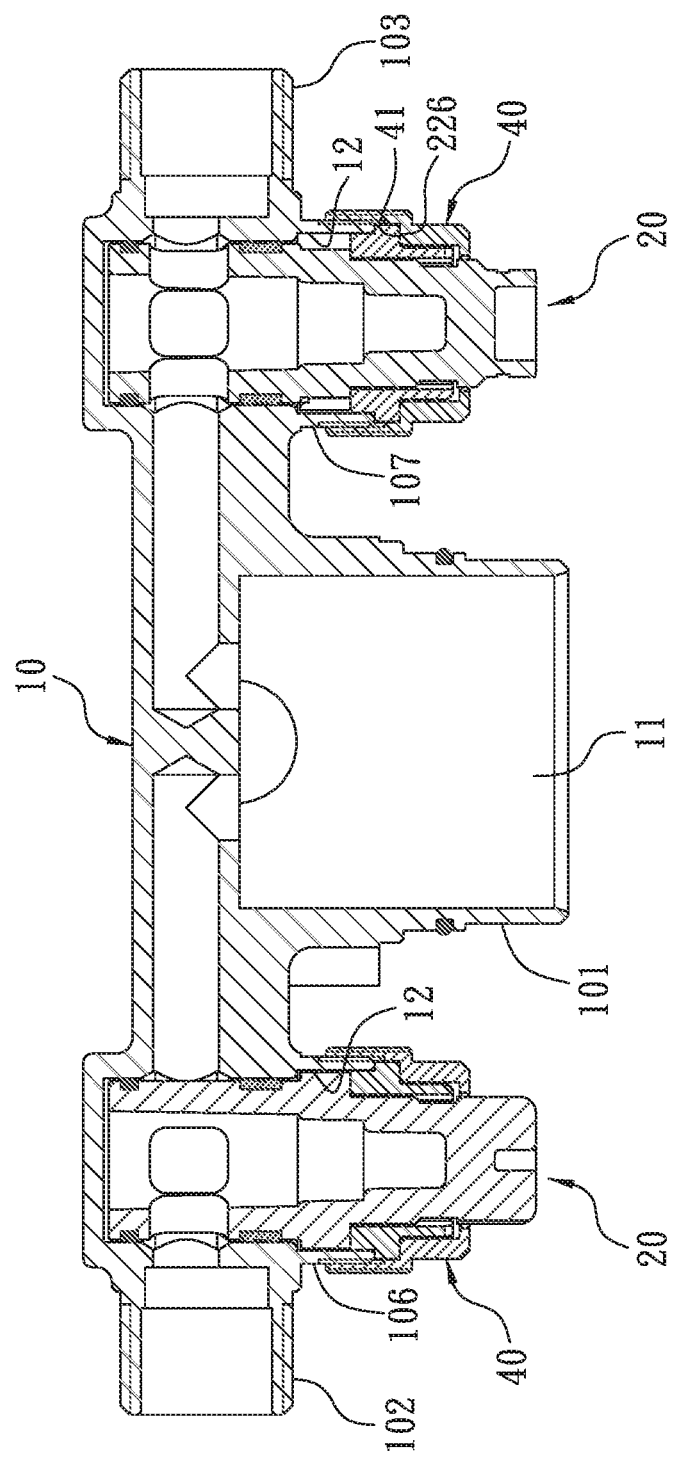
FIG. 2 is a cross sectional view showing the assembly of the valve core connection structure and the stop valve set of the valve assembly according to the preferred embodiment of the present invention.
Figure 3:
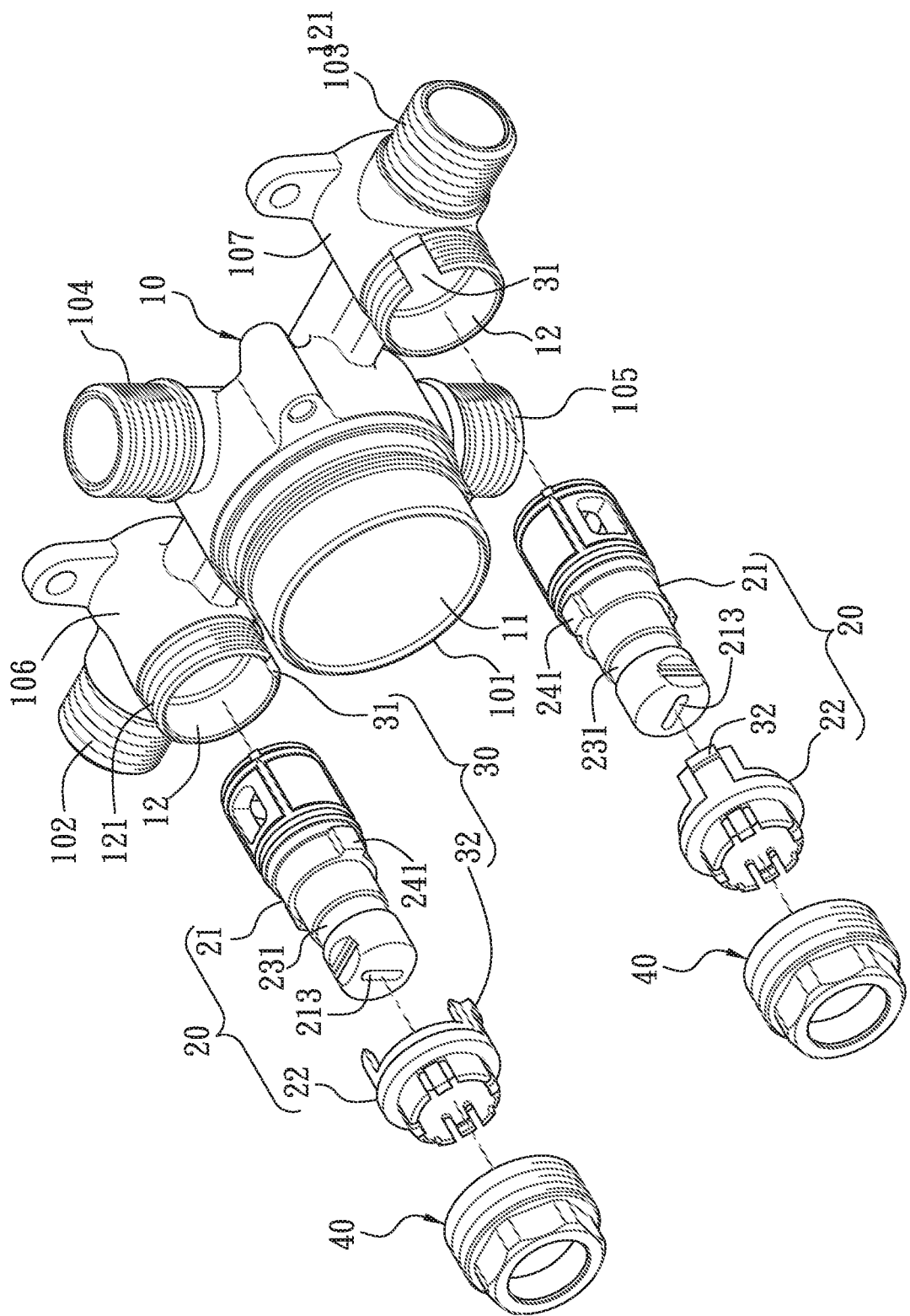
FIG. 3 is a perspective view showing the exploded components of the valve core connection structure and the stop valve set of the valve assembly according to the preferred embodiment of the present invention.

With reference to FIGS. 1-3, a valve core connection structure of a valve assembly 1 according to a preferred embodiment of the present invention comprises: a body 10, two stop valve sets 20, two limitation structures 30, and two locking sleeves 40.

Referring to FIG. 3, the body 10 includes a holder 101, a first inflow connector 102 extending horizontally from a first side of the holder 101, a second inflow connector 103 extending horizontally from a second side of the holder 101 opposite to the first inflow connector 102, a first outflow connector 104 extending vertically from a top of the body 10, and a second outflow connector 105 vertically extending from a bottom of the body 10 opposite to the first outflow connector 104, a first inflow seat 106 formed on the first inflow connector 102, and a second inflow seat 107 formed on the second inflow connector 103; wherein the holder 101 has a first accommodation cavity 11 defined therein, the first inflow seat 106 and the second inflow seat 107 have two second accommodation cavities 12 defined therein respectively so as to communicate with the first accommodation cavity 11 via the first inflow connector 102 and the second inflow connector 103 individually.

As well-known art, the body 10 includes a mixing valve connected on the holder 101 and an operation bar configured to control the mixing valve, such that water flow from the first outflow connector 104 and the second outflow connector 105 and its temperature are controlled by mating with a pressure balance valve so as to provide constant temperature control. The first outflow connector 104 is in connection to a shower via an upper water tube, and the second outflow connector 105 is coupled to a faucet via a lower water tube. Since the mixing valve, the operation bar, the upper water tube, the lower water tube, the shower, and the faucet are well-known art, further remarks are not disclosed in FIGS. 1-10.

As shown in FIGS. 3-7, each of the two stop valve sets 20 includes a valve core 21, a limiting loop 22, a defining structure 23, and a locating structure 24. The valve core 21 is accommodated in each of the two second accommodation cavities 12 of the body 10, the limiting loop 22 is fitted on the valve core 21, and the defining structure 23 is defined between the valve core 21 and the limiting loop 22 so that the valve core 21 retains with the limiting loop 22 so as to avoid a removal of the limiting loop 22 from the valve core 21. The locating structure 24 is defined between the valve core 21 and the limiting loop 22 so that the valve core 21 rotates between an opening position and a closing position of a predetermined angle relative to the limiting loop 22.

As illustrated in FIG. 3, each of the two limitation structures 30 is defined between a peripheral fence 121 of each second accommodation cavity 12 and the limiting loop 22 so that the limiting loop 22 is retained on the peripheral fence 121 of each second accommodation cavity 12, thus limiting rotation of the limiting loop 22.

Each limitation structure 30 includes a concave portion 31 and a convex portion 32; the concave portion 31 is arranged on one of the peripheral fence 121 and the limiting loop 22, and the convex portion 32 is arranged on the other of the peripheral fence 121 and the limiting loop 22. In this embodiment, the concave portion 31 is arranged on the peripheral fence 121 of each second accommodation cavity 12 and extends to a top of the peripheral fence 121, and the convex portion 32 is arranged on the limiting loop 22 and retains in the concave portion 31.

Figure 4:
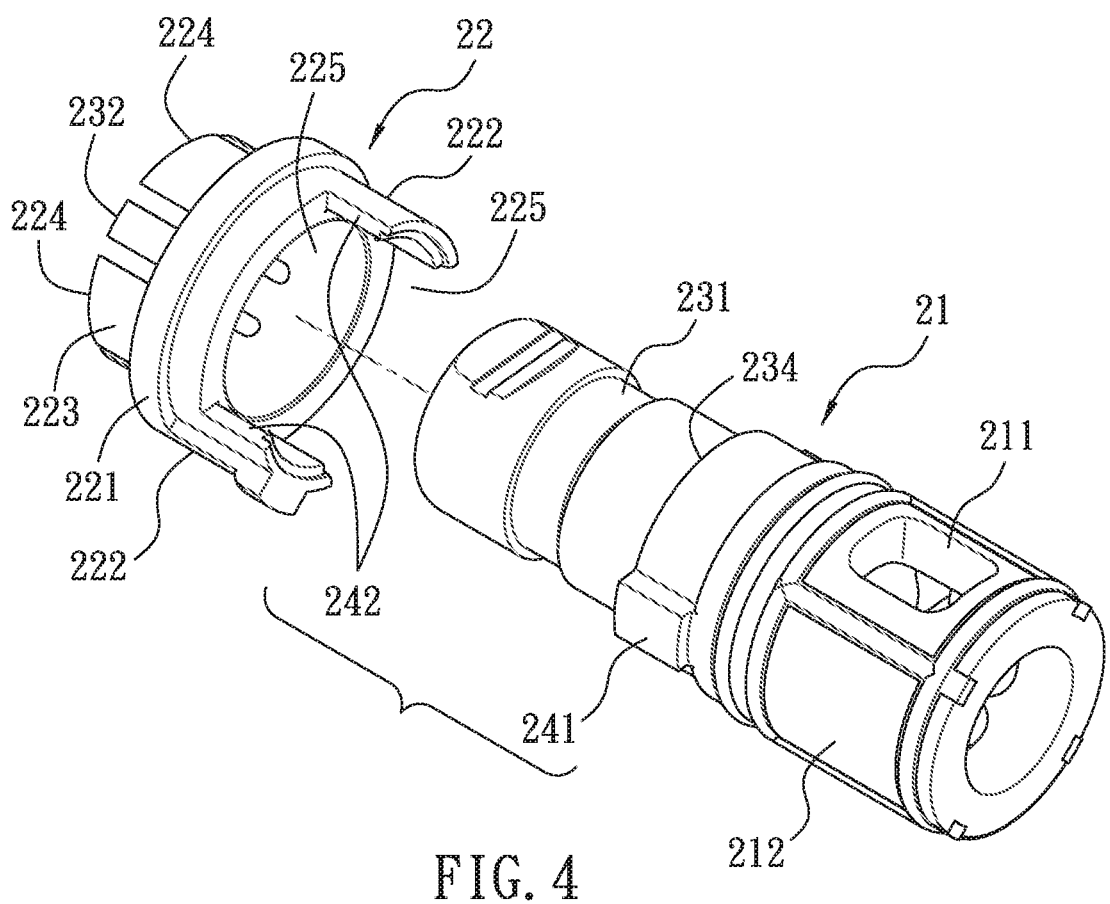
FIG. 4 is a perspective view showing the exploded components of a part of the valve core connection structure and the stop valve set of the valve assembly according to the preferred embodiment of the present invention.
Figure 5:
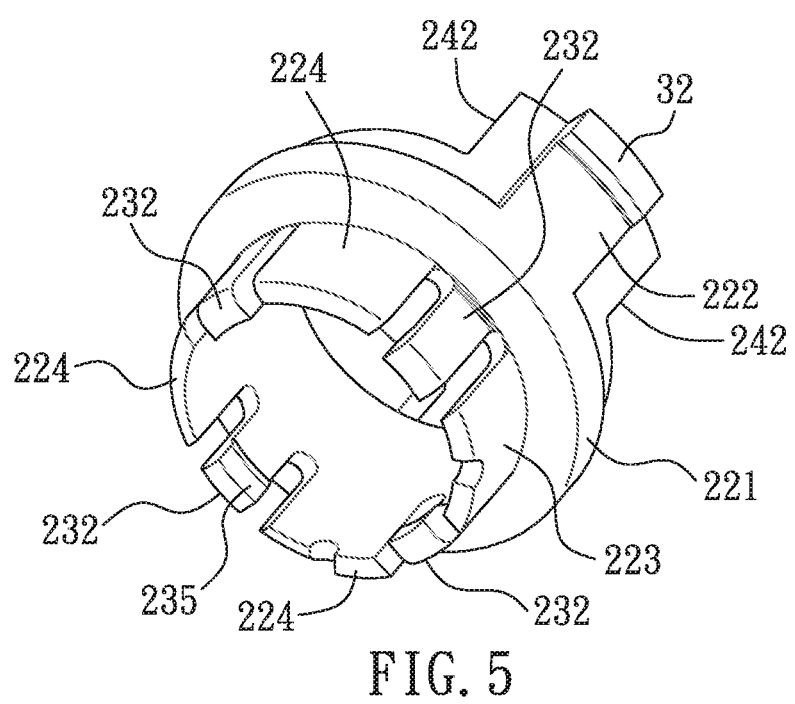
FIG. 5 is another perspective view showing the assembly of a part of the valve core connection structure and the stop valve set of the valve assembly according to the preferred embodiment of the present invention.

With reference to FIGS. 4 and 5, the limiting loop 22 includes a surround portion 221 and two feet 222 extending from a bottom of the surround portion 221; one of the two feet 222 has the convex portion 32 formed on an outer wall thereof.

The surround portion 221 of the limiting loop 22 has a locking rib 223 extending from a top thereof; the defining structure 23 is located on the limiting loop 22, and at least one part of the defining structure 23 forms on the locking rib 223 as shown in FIGS. 4 and 5.

Figure 6:
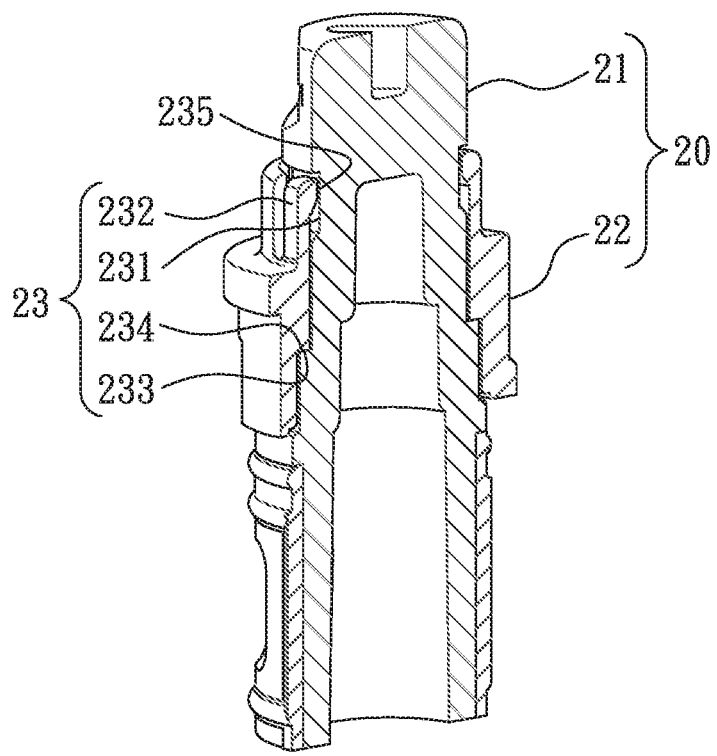
FIG. 6 is a cross-sectional perspective view showing the assembly of a part of the valve core connection structure and the stop valve set of the valve assembly according to the preferred embodiment of the present invention.

Referring to FIG. 6, the defining structure 23 has a peripheral groove 231, multiple hooks 232, a stepped trench 233, and a stepped fence 234; the peripheral groove 231 forms on an outer wall of the valve core 21; the multiple hooks 232 form on the locking rib 223 of the limiting loop 22 and retain in the peripheral groove 231 so as to avoid a removal of the limiting loop 22 from the valve core 21; the stepped trench 233 forms in the limiting loop 22; and the stepped fence 234 forms on the outer wall of the valve core 21 so as to engage with the stepped trench 233, thus preventing a removal of the limiting loop 22 from the valve core 21. The locking rib 223 are defined by four arcuate extensions 224 and the multiple hooks 232, wherein each of the multiple hooks 232 is defined between any two adjacent of the four arcuate extensions 224, and each hook 232 has a hook 235 formed on a distal end thereof so as to flexibly retain in the peripheral groove 231.

Figure 7:
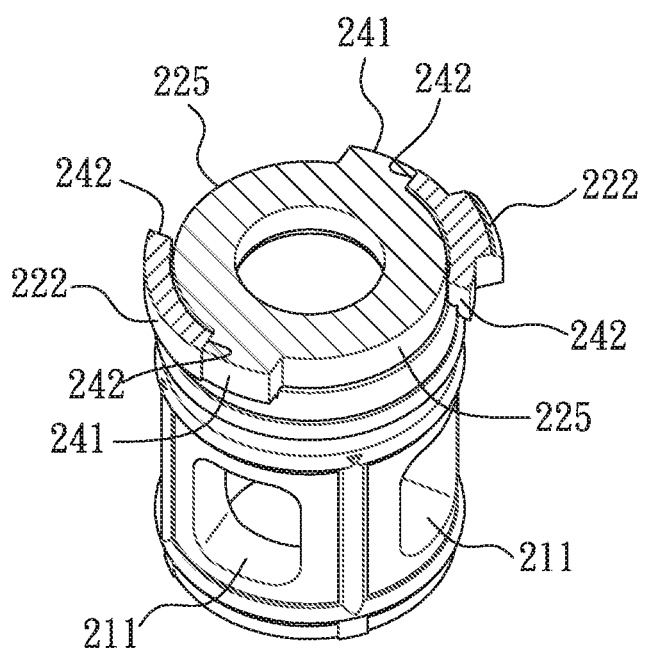
FIG. 7 is another cross-sectional perspective view showing the assembly of a part of the valve core connection structure and the stop valve set of the valve assembly according to the preferred embodiment of the present invention.

As shown in FIG. 7, the locating structure 24 has the two feet 222 arranged on the limiting loop 22. The locating structure 24 includes at least one positioning block 241 and at least two first fixing shoulders 242; wherein the at least one positioning block 241 forms on the outer wall of the valve core 21; the at least two first fixing shoulders 242 form on the two feet 222 of the limiting loop 22 respectively so as to limit a rotation of the at least one positioning block 241 between the at least two first fixing shoulders 242. Two symmetrically spaced notches 225 are defined between the two feet 222, and each of the two symmetrically spaced notches 225 has two first fixing shoulders 242 individually formed on two sides thereof. In other words, each spaced notch 225 has the two first fixing shoulders 242 formed on two sides thereof individually so that after each positioning block 241 is housed in each spaced notch 225, it is defined and rotates between the two first fixing shoulders 242.

As illustrated in FIGS. 1-3, each of the two locking sleeves 40 is screwed on the first inflow seat 106 and the second inflow seat 107 so that the limiting loop 22 and the valve core 21 are limited in each second accommodation cavity 12.

The limiting loop 22 includes a second fixing shoulder 226; each locking sleeve 40 includes a forcing portion 41 configured to abut against the second fixing shoulder 226 of the limiting loop 22.

Figure 8:
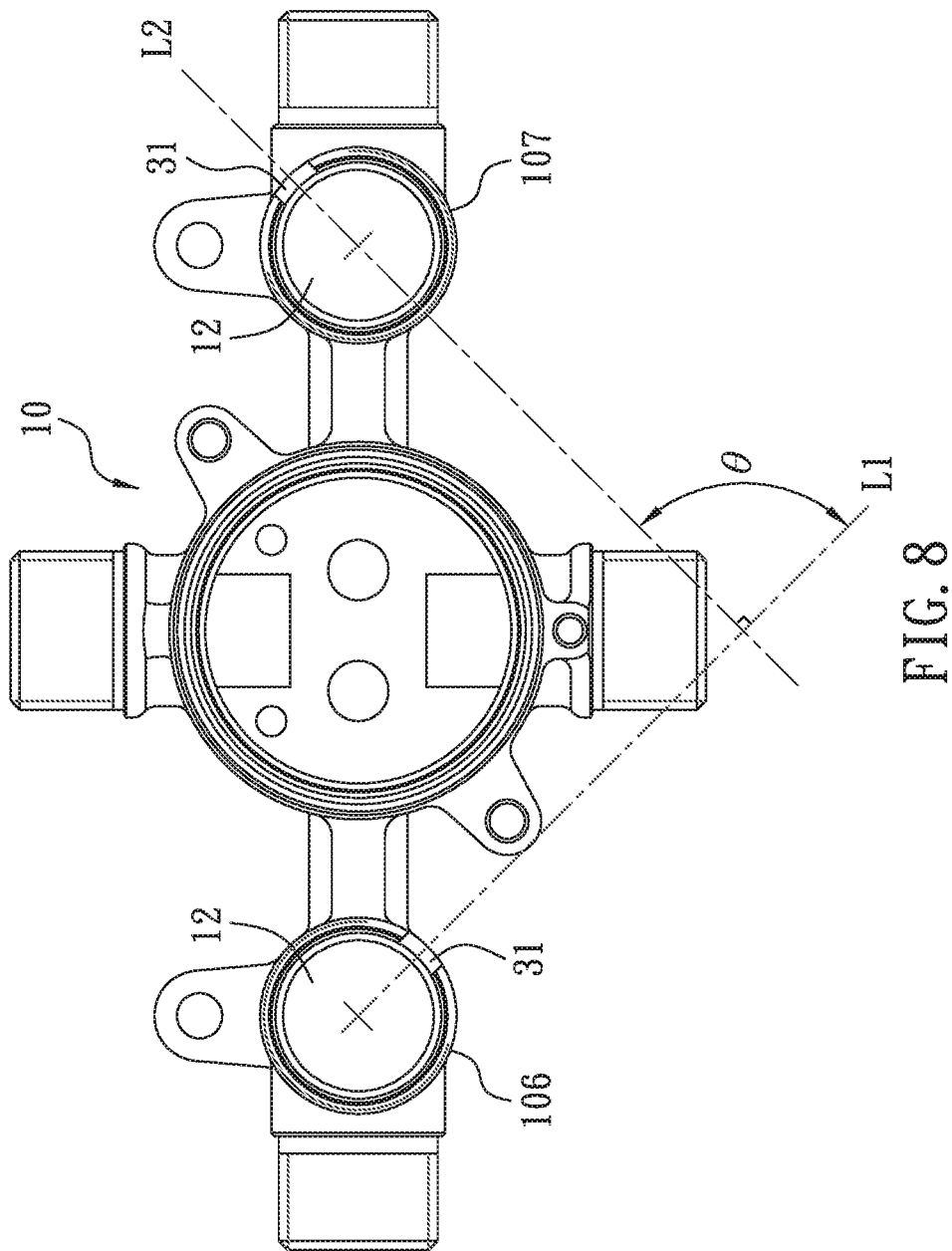
FIG. 8 is a side plane view showing the operation of the valve core connection structure and the stop valve set of the valve assembly according to the preferred embodiment of the present invention.
Figure 9:
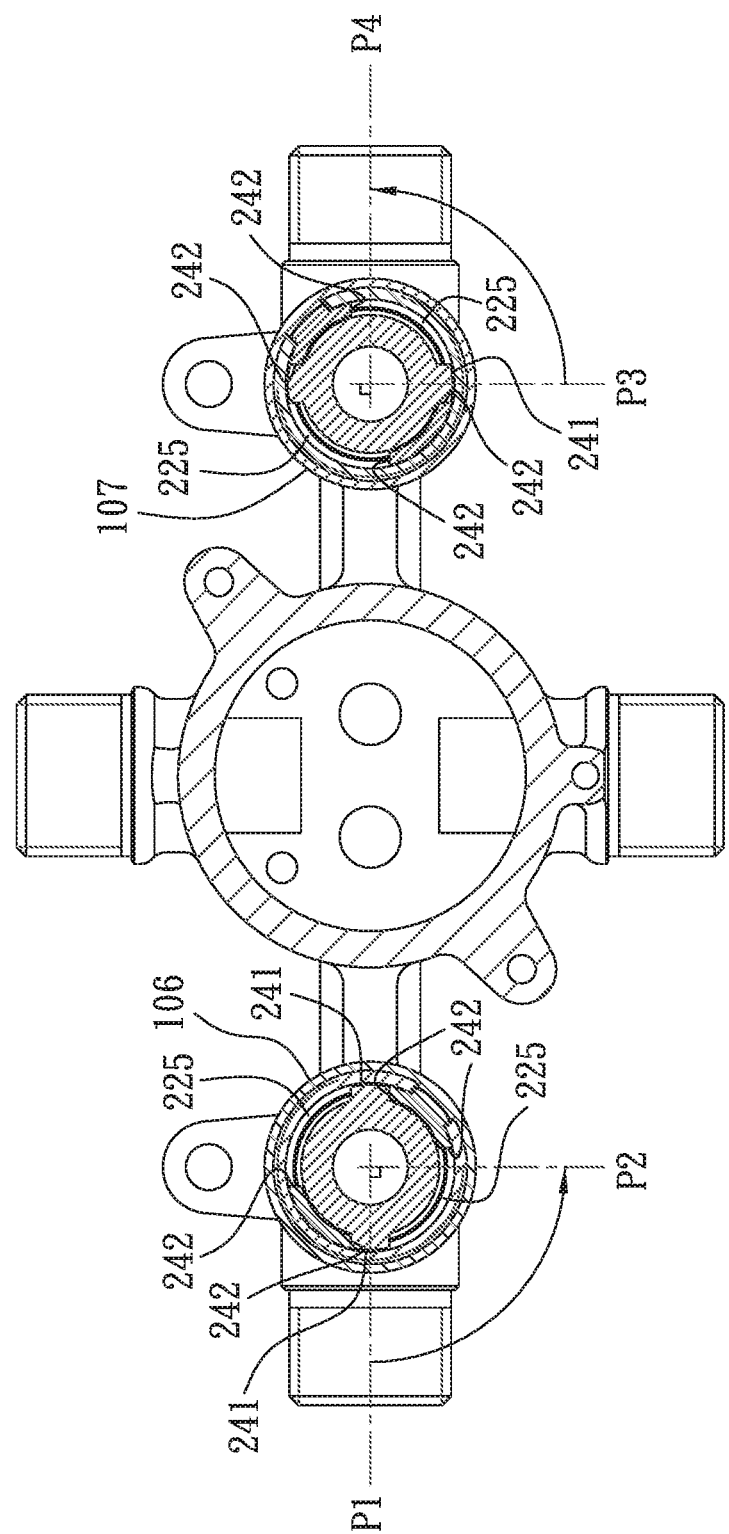
FIG. 9 is a cross sectional view showing the operation of the valve core connection structure and the stop valve set of the valve assembly according to the preferred embodiment of the present invention.
Figure 10:
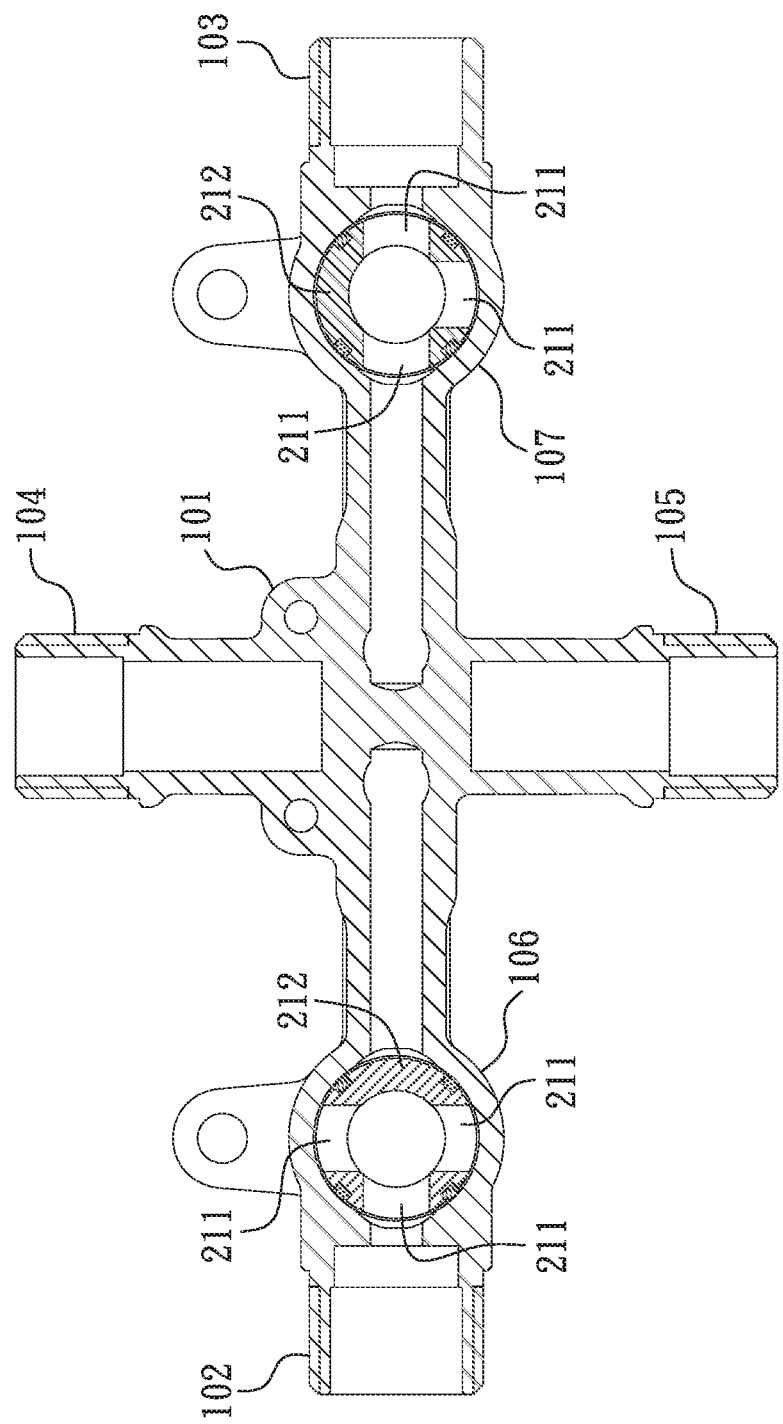
FIG. 10 is another cross sectional view showing the operation of the valve core connection structure and the stop valve set of the valve assembly according to the preferred embodiment of the present invention.

With reference to FIG. 8, a first direction L1 forms on a recessed portion 122 of the first inflow seat 106 relative to a central axis of one second accommodation cavity 12; a second direction L2 forms on a recessed portion 122 of the first inflow seat 106 relative to a central axis of the other second accommodation cavity 12, and a 90-degree angle θ is defined between the first direction L1 and the second direction L2. Referring to FIG. 10, the valve core 21 includes three through orifices 211 and a close fence 212 which are arranged on four isometric positions of the outer wall of the valve core 21 respectively. As shown in FIGS. 9 and 10, when one of the two valve cores 21 on the first inflow seat 106 is rotated to the opening position, it conducts cold water or hot water into the holder 101 via two of the three through orifices 211. When the other valve core 21 on the second inflow seat 107 is rotated to the closing position, it stops the cold water or the hot water flowing into the holder 101 of the body 10 by using the close fence 212.

It is to be noted that two concave portions 31 of two limitation structures 30 are arranged by way of the 90-degree angle θ, the three through orifices 211, and the close fence 212 so that the one valve core 21 on the first inflow seat 106 is in communication with the other valve core 21 on the second inflow seat 107.

With reference to FIGS. 2 and 3, the two stop valve sets 20 are identical. Referring to FIGS. 10 and 11, when the one valve core 21 on the first inflow seat 106 is located on the closing position, a positioning block 241 of the one valve core 21 is located on a P1 position and the one valve core 21 is rotated 90 degrees in a counterclockwise direction so that the positioning block 241 of the one valve core 21 reaches a P2 position to abut against one first fixing shoulder 242 corresponding to the positioning block 241, hence the one valve core 21 is rotated and fixed on the opening position. When the other valve core 21 on the second inflow seat 107 is located on the opening position, a positioning block 241 of the other valve core 21 is located on a P3 position and the other valve core 21 is rotated 90 degrees in the counterclockwise direction so that the positioning block 241 of the other valve core 21 reaches a P4 position to abut against the other first fixing shoulder 242 corresponding to the positioning block 241, hence the one valve core 21 is rotated and fixed on the closing position. Accordingly, after accommodating the two stop valve sets 20 in the first inflow seat 106 and the second inflow seat 107 respectively, the two valve cores 21 are rotated within the 90-degree angle θ so as to open or close the cold water and the hot water individually.

The two valve cores 21 are limited within the 90 degrees and are quickly rotated and fixed on the opening position and the closing position. Preferably, each valve core 21 has an indicator arranged on a top thereof so as to determine a position (such as the opening position, the closing position or between the opening position and the closing position) of each valve core 21. The indicator of each valve core 21 is an elongated slot 213, as shown in FIGS. 1 and 3, wherein when the elongated slot 213 is horizontal, it represents that the valve core 21 (i.e. the other valve core 21 on the second inflow seat 107) is located on the opening position. When the elongated slot 213 is vertical, it denotes that the valve core 21 (i.e. the one valve core 21 on the first inflow seat 106) is located on the closing position.

Accordingly, each valve core 21 of the valve assembly 1 is rotated within the 90 degrees (i.e. between the opening position and the closing position) by using the limiting loop 22 so that maintenance staff learns the opening position and the closing position accurately by touching each valve core and the limiting loop 22, and each valve core 21 is rotated between the opening position and the closing position clearly by using the indicator on each valve core 21 so as to facilitate installation, testing of water leakage, maintenance, and replacement. For example, in the testing of water leakage, each valve core 21 is rotated and fixed on the opening position exactly. Before the maintenance and the replacement, each valve core 21 is rotated and fixed on the closing position exactly so as to avoid water permeability or water splash.

The two stop valve sets 20 of the valve assembly 1 are fixed randomly, easily, and quickly so as to obtain foolproof purpose, and the two stop valve sets 20 are produced at low fabrication cost.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A valve core connection structure of a valve assembly comprising:
a body including a holder, a first inflow connector extending from a first side of the holder, a second inflow connector extending from a second side of the holder opposite to the first inflow connector, a first outflow connector extending from a top of the body, and a second outflow connector extending from a bottom of the body opposite to the first outflow connector; a first inflow seat formed on the first inflow connector, and a second inflow seat formed on the second inflow connector; the holder having a first accommodation cavity defined in the holder; the first inflow seat and the second inflow seat having two second accommodation cavities defined in the first inflow seat and the second inflow seat respectively so as to communicate with the first accommodation cavity via the first inflow connector and the second inflow connector individually;
two stop valve sets, each of the two stop valve sets including a valve core, a limiting loop, a defining structure, and a locating structure; the valve core being accommodated in each of the two second accommodation cavities of the body, the limiting loop being fitted on the valve core; and the defining structure being defined between the valve core and the limiting loop so that the valve core retains with the limiting loop so as to avoid a removal of the limiting loop from the valve core; the locating structure being defined between the valve core and the limiting loop so that the valve core rotates between an opening position and a closing position of a predetermined angle relative to the limiting loop;
two limitation structures, each of the two limitation structures being defined between a peripheral fence of each second accommodation cavity and the limiting loop so that the limiting loop is retained on the peripheral fence of each second accommodation cavity, thus limiting rotation of the limiting loop;
two locking sleeves, each of the two locking sleeves being screwed on the first inflow seat and the second inflow seat so that the limiting loop and the valve core are limited in each second accommodation cavity;
wherein the defining structure has a peripheral groove, multiple hooks, a stepped trench, and a stepped fence; the peripheral groove forms on an outer wall of the valve core; the multiple hooks form on the locking rib of the limiting loop and retain in the peripheral groove so as to avoid a removal of the limiting loop from the valve core; the stepped trench forms in the limiting loop; and the stepped fence forms on the outer wall of the valve core so as to engage with the stepped trench, thus preventing a removal of the limiting loop from the valve core;
wherein the locating structure includes at least one positioning block and at least two first fixing shoulders; wherein the at least one positioning block forms on the outer wall of the valve core; and the at least two first fixing shoulders form on the limiting loop respectively so as to limit a rotation of the at least one positioning block between the at least two first fixing shoulders.

2. The valve core connection structure as claimed in claim 1, wherein each limitation structure includes a concave portion and a convex portion; the concave portion is arranged on one of the peripheral fence and the limiting loop; and the convex portion is arranged on the other of the peripheral fence and the limiting loop.

3. The valve core connection structure as claimed in claim 2, wherein the concave portion is arranged on the peripheral fence of each second accommodation cavity and extends to a top of the peripheral fence; and the convex portion is arranged on the limiting loop and retains in the concave portion.

4. The valve core connection structure as claimed in claim 3, wherein the limiting loop includes a surround portion and two feet extending from a bottom of the surround portion; one of the two feet has the convex portion formed on an outer wall thereof.

5. The valve core connection structure as claimed in claim 4, wherein the surround portion of the limiting loop has a locking rib extending from a top thereof the defining structure is located on the limiting loop, and at least one part of the defining structure forms on the locking rib.

6. The valve core connection structure as claimed in claim 4, wherein the locating structure has the two feet arranged on the limiting loop.

7. The valve core connection structure as claimed in claim 1, wherein the limiting loop includes a surround portion and two feet extending from a bottom of the surround portion; the locking rib are defined by multiple arcuate extensions and the multiple hooks, wherein each of the multiple hooks is defined between any two adjacent of the four arcuate extensions, and each hook has a hook formed on a distal end thereof so as to flexibly retain in the peripheral groove.

8. The valve core connection structure as claimed in claim 7, wherein the limiting loop includes two feet extending from a bottom of the surround portion, and the locating structure has the two feet arranged on the limiting loop.

9. The valve core connection structure as claimed in claim 7, wherein the limiting loop includes two feet extending from a bottom of the surround portion, the defining structure has one of the two feet formed on the limiting loop.

10. The valve core connection structure as claimed in claim 1, wherein the limiting loop includes a surround portion and two feet extending from a bottom of the surround portion; at least one spaced notch is defined between the two feet, and the at least one spaced notch has the at least two first fixing shoulders individually formed on two sides thereof so that each positioning block is defined and rotates between the at least two first fixing shoulders.

11. The valve core connection structure as claimed in claim 10, wherein the defining structure has one of the two feet formed on the limiting loop.

12. The valve core connection structure as claimed in claim 10, wherein the surround portion of the limiting loop has a locking rib extending from a top thereof; the defining structure is located on the limiting loop, and at least one part of the defining structure forms on the locking rib.

13. The valve core connection structure as claimed in claim 1, wherein the limiting loop includes a second fixing shoulder; each locking sleeve includes a forcing portion configured to abut against the second fixing shoulder of the limiting loop.

14. The valve core connection structure as claimed in claim 2, wherein a first direction forms on a recessed portion of the first inflow seat relative to a central axis of one second accommodation cavity; a second direction forms on a recessed portion of the first inflow seat relative to a central axis of the other second accommodation cavity, and a 90-degree angle is defined between the first direction and the second direction; the valve core includes three through orifices and a close fence which are arranged on four isometric positions of the outer wall of the valve core respectively, when one of the two valve cores on the first inflow seat is rotated to the opening position, it conducts cold water or hot water into the holder via two of the three through orifices; when the other valve core on the second inflow seat is rotated to the closing position, the other valve core stops the cold water or the hot water flowing into the holder of the body by using the close fence.

15. The valve core connection structure as claimed in claim 1, wherein each valve core has an indicator arranged on a top thereof so as to determine a position of each valve core, and the position of each valve core is any one of an opening position, a closing position and between the opening position and the closing position.

16. The valve core connection structure as claimed in claim 15, wherein the indicator of each valve core is an elongated slot, when the elongated slot is horizontal, the other valve core on the second inflow seat is located on the opening position; when the elongated slot is vertical, the one valve core on the first inflow seat is located on the closing position.

17. A stop valve set of a valve assembly comprising:
a valve core accommodated in the body;
a limiting loop fitted on the valve core and limited on the body;
a defining structure defined between the valve core and the limiting loop so that the valve core retains with the limiting loop so as to avoid a removal of the limiting loop from the valve core; and
a locating structure defined between the valve core and the limiting loop so that the valve core rotates between an opening position and a closing position of a predetermined angle relative to the limiting loop;
wherein the defining structure has a peripheral groove, multiple hooks, a stepped trench, and a stepped fence; the peripheral groove forms on an outer wall of the valve core; the multiple hooks form on the locking rib of the limiting loop and retain in the peripheral groove so as to avoid a removal of the limiting loop from the valve core; the stepped trench forms in the limiting loop; and the stepped fence forms on the outer wall of the valve core so as to engage with the stepped trench, thus preventing a removal of the limiting loop from the valve core;
wherein the locating structure includes at least one positioning block and at least two first fixing shoulders; wherein the at least one positioning block forms on the outer wall of the valve core; and the at least two first fixing shoulders form on the limiting loop respectively so as to limit a rotation of the at least one positioning block between the at least two first fixing shoulders.

18. The valve core connection structure as claimed in claim 17 further comprising a locking sleeve screwed on the body so that the limiting loop and the valve core are limited in the body.

19. The valve core connection structure as claimed in claim 17, wherein each limitation structure includes a convex portion which is arranged on the limiting loop so as to be engaged on the body and to limit rotation of the limiting loop.

* * * * *